June 17, 1958

J. VAN ACKEREN 2,839,454

COKING RETORT OVEN

Original Filed July 14, 1951

INVENTOR.
JOSEPH VAN ACKEREN
BY
Thomas J. P. O'Brien
HIS ATTORNEY

Fig. 3.

INVENTOR.
JOSEPH VAN ACKEREN
BY Thomas J. P. O'Brien
his ATTORNEY

June 17, 1958 J. VAN ACKEREN 2,839,454
COKING RETORT OVEN
Original Filed July 14, 1951 9 Sheets-Sheet 4

INVENTOR.
JOSEPH VAN ACKEREN.
BY Thomas J. P. O'Brien
his ATTORNEY

June 17, 1958  J. VAN ACKEREN  2,839,454
COKING RETORT OVEN

Original Filed July 14, 1951  9 Sheets-Sheet 5

INVENTOR.
JOSEPH VAN ACKEREN
BY Thomas J. P. O'Brien
his ATTORNEY.

Fig. 9

June 17, 1958  J. VAN ACKEREN  2,839,454
COKING RETORT OVEN
Original Filed July 14, 1951  9 Sheets-Sheet 9

INVENTOR.
JOSEPH VAN ACKEREN.
BY Thomas J. P. O'Brien
his ATTORNEY.

United States Patent Office 2,839,454
Patented June 17, 1958

2,839,454

COKING RETORT OVEN

Joseph van Ackeren, Pittsburgh, Pa., assignor to Koppers Company, Inc., a corporation of Delaware Application March 14, 1957, Serial No. 646,095

20 Claims. (Cl. 202—267)

This invention relates to improvements in silica brick cross-regenerative coking retort oven batteries of the type provided with fireclay brick walls in the lower temperature regions of the regenerators, and especially at the bases thereof where the walls rest on a concrete mat, in order to eliminate the use of the more expensive silica brick in such lower temperature regions, where the use of such silica material is not required to withstand the lower temperatures prevailing in such lower regions of the battery and has a markedly lower coefficient of expansion, as compared with its degree of expansion in the upper coking chamber region of the battery. More particularly the invention relates to improvements which simplify the designing and erection of oven batteries incorporating such feature in ovens of the recirculating duct type of the assignee's Joseph van Ackeren Patent 2,306,678 of December 29, 1942, having further improved features of the assignee's Joseph van Ackeren copending application Serial No. 236,808, filed July 14, 1951, of which the present invention is a continuation improvement in part.

Coke oven batteries so built, customarily are braced by buckstays at the side faces of the battery, which extend from the top of the battery down to the top of the mat, to draw the silica and clay brickwork together, thus bracing both areas in unison during expansion, or by special auxiliary bracing means for separately bracing the fireclay brick portion by means of adjustable plates at the sides of the battery, or by means for tieing this brick portion together, independently of the bracing of the silica brickwork of the battery by the buckstays, to allow the adjustment of the tension on the upper higher temperature oven masonry composed of silica brick according to the high coefficient of thermal expansion which it has at the higher temperatures prevailing in the oven chamber region, as compared with its coefficient of expansion at the lower temperatures prevailing at the levels below the bottoms of the oven chambers, and particularly below the tops of the sole channels, and an independent adjustment of the brickwork at said lower levels according to the low coefficient of thermal expansion fireclay brick has at the very much reduced temperatures in the regenerator region of the battery, and at which region this less expensive material is better suited to use in these coke ovens, due to the fact that the outgoing gases in that region are at a much lower temperature, as a result of the absorption of waste heat therefrom by the regenerators above, and also due to the cooling action on the brickwork at the sole flue level of the newly entering colder air and gas for preheating and combustion.

The bracing of these two different kinds of brickwork of such oven batteries when braced together in unison as aforesaid involves pairs of buckstays disposed at opposite sides of the battery alongside the ends of the silica brick heating walls and regenerator pillar walls, the buckstays being drawn together at their tops by tie rods passing across the top of the battery and being anchored at their bottoms to the oven mat below the sole channels, by securing them by stays to the oven mat, or by drawing the buckstays together at their bottoms by means of tie rods passing through the mat. Such form of bracing however, results in bowing of the buckstays, along the ends of the regenerator walls as well as the ends of the heating walls throughout the height of the coking chambers, resulting in less perfect bracing of the most expansive portion of the battery. The separate bracing of the fireclay brickwork below the more expansive portion of the battery, especially at the level of the sole channels, does lend itself to maintaining the buckstays straight, and hence more perfect bracing throughout the height of the regenerators as well as coking chambers, but necessitates disposing the aforesaid lower tie rods, or a second series of tie rods independent of the first, in the layer of fireclay brickwork at the sole flue level or below the same, with provision at opposite sides of the battery for tightening this region of brickwork independently of the vertical buckstays.

The general object or advantage of building coke ovens in the above described manner has been to take advantage of the great economy in cost of construction of large batteries of ovens that is afforded by the use of fireclay instead of silica at the region of the regenerator sole channels. More generally these oven batteries are built of silica brick all the way down, including the sole flue area, to the mat, thus sacrificing such possible economy, because much of the advantage of the economy in such use of fireclay brick is offset by the extra cost involved in incorporating, and maintaining the adjustment of, the auxiliary tieing means for the separate tightening of this minor portion of the brickwork. The location of the tie rods in the sole channels also interferes to some extent with the design and erection of the parts for the distribution of inflowing air or gas to the regenerators into the sole flues, which discharge to a tunnel leading to the smoke stack, thus interfering with the regulation of the draft through the different parts of regenerators and the different heating flues alongside the coking chambers.

Location of such auxiliary tie rods in the bases of the regenerator walls also complicates the design and erection of the battery for underjet opeartion, since the underjet ducts must lead from a basement space beneath the mat, up through the same region of the regenerator walls through which such tie rods would pass, and the regenerators, their walls, and underjet ducts must be redesigned and erected in order to have the tie rods in alternate regenerator walls.

These disadvantages are particularly objectionable for coke ovens in which it is desired to provide for recirculation of waste gas by means of recirculation ducts located in the oven mat according to my patent 2,306,678 of December 29, 1942, when employed in conjunction with the well known cross-over flue interconnected combustion flue type of construction of coke oven batteries of Koppers Company, Inc., Patent 1,374,546 and its improved type thereof illustrated in J. Becker Patent 2,447,837 of August 24, 1948, since with the underjet ducts in alternate pillar walls the tie rods must be limited to intermediate walls only.

The general object of the present invention is to provide a simpler, more economical, and facile way of bracing a coke oven battery having such fireclay brickwork interposed between the concrete mat and a superimposed silica brickwork mass constituting a part of the regenerators, the heating walls and coking chambers.

More particularly the invention provides a simpler and more economical bracing of coke ovens constituted of such a lower fireclay area and upper silica masonry area which eliminates the necessity for bracing the lower fireclay brick area by means of the lower ends of the buckstay for the upper silica area, or by means of auxiliary bracing means at the side faces of the battery, or of using tie rods in the mat or in the region of the sole flue or in the bases of the regenerator pillar walls for bracing such lower fireclay brick area, thereby providing a design effective for bracing the silica brickwork by means of shorter and hence straighter buckstays alongside the oven chambers during expansion of the battery, and also simplifying the design and erection of such ovens for use with underjet ducts and particularly in association with the recirculation ducts of my aforesaid patent.

According to the present invention, it is not necessary to separately brace the lower temperature regenerator portions of such coke ovens at the outer side faces of the battery to restrain such portion against outward movement under thermal expansion during heating of the battery, or under load of coking coal after the ovens are fully expanded when composed of fireclay brick in such low temperature regions and silica brick in the upper higher temperature regions, as is necessary to do when said lower temperature regions are also composed of silica brick.

While both types of ovens show an increasing difference in expansion at the outer faces of the brickwork, from the higher temperature levels at the tops of the regenerators down to the top of the concrete mat at the base line of the regenerators, the expansion of the clay brick from the center of the mass of brick towards the two outer opposite sides is markedly less than that of the expansion of silica brick, due to the entirely different expansion characteristics of fireclay and silica in the same temperature range that exists in the regenerators between the base line thereof and the tops of the regenerator chambers for instance at the oven floor line. At the level of the oven chamber floor, which is at a temperature of about 2200° F., silica brickwork of a forty foot oven chamber, when heated up from the cold state, expands outwardly about three and one quarter inches from the center of the mass, and only slightly less than this, about 2.9" at the temperature of 1200° F., which exists at the six foot level of the middle height of the regenerators. At the next lower three foot level of the height of the regenerators, where the temperature is about 1000° F., the silica expands about 0.3 inch less, and outward expansion of as much as two and seven tenth inches from the center of the battery, showing nearly a straight line, with a three inch outward movement from its cold state from oven chamber top down to the three foot level of the regenerators.

At the level of the top of the sole flues the temperature is about 750° F. and at this temperature the silica expands from the cold state outwardly about two and one half inches from the outer face of the cold brickwork mass. From this level to the base line of the regenerators at the top of the concrete mat, the sole flue area temperature drops to 400° F. and the expansion is as much as 1.0".

Hence, from the top of the mat to the six foot middle height of the regenerators, the silica brickwork expands from a perpendicular line in a cold state at the outer face of the brickwork, a distance increasing from one and six tenths of an inch at the top of the concrete mat to a distance of two and nine tenths of an inch. Consequently it is necessary to brace such expanding silica brickwork against such outward movement to hold the bricks close to each other during the heating up of the oven. It is not necessary to increase the amount of bracing over the amount required for restraining such movement during expansion, in order to restrain the brickwork from flattening under coking load when heated for coking, since it is known that the brick elements are strong enough to withstand the weight of such a coking load when heated without further bracing for such purpose. It is, however, necessary to supplement the amount of bracing required for restraining such movement of the silica brickwork, as a result of its thermal expansion, by a further amount to restrain the silica brick against distention by the outward thrust imposed on their tops as a result of the greater relative movement of the bricks above by reason of their greater incremental expansion properties at slightly higher temperatures.

In addition, it is also necessary to furnish a still further supplement to restrain the silica brick in regions progressively further from the center of the brickwork mass against the further movement to which they are subjected by reason of the cumulative thrust that is progressively imposed on them at such regions further out from the center of the brickwork mass as a result of the thrust imposed on the brick nearer the center of the mass by the brick in a tier above.

However, all of these same conditions do not apply to the brickwork of coke ovens composed of a composite of a silica brick masonry mass in the high temperature regions above the level of said six foot middle height of the battery, and a claybrick masonry mass in the lower temperature regions between said level and the lowest level of the regenerators at the top of the concrete mat.

In such composite ovens while the outside face of the regenerator fireclay brickwork shows a decreasing difference in expansion from said six foot level down to the level of the top of the concrete mat, this clay brick difference is very small in comparison to the difference existing with silica brick in this region of coke oven batteries due to the very low coefficient of expansion of fireclay in the range of temperatures between said levels, as compared to the much higher coefficient of expansion of silica in said range of temperatures. Also, due to said low coefficient of expansion of clay in said temperature range, the extent of overall movement of the fireclay brickwork outwardly from the center of the mass is practically nil. The amount is so small cumulatively from the center to each outer side face of the regenerator brickwork that the difference between the vertical cold outer face and the expanded hot outer face is hardly perceptible, the expanded hot outer face remaining substantially vertical and being only a fifth of an inch, .215", longer at the 400° F. level of the top of the mat, and about two fifths, .417" at the 750° F. level of the top of the sole channels, three fifths of an inch, .66", at the three foot 1000° F. level from the mat, and four fifths of an inch, .83", at the beginning of the fully expanded portion of maximum possible expansion of silica at the middle 1200° F. six foot height of the regenerators.

Consequently it should not be necessary, as has been done heretofore in this art, to provide for bracing at the outer faces of the regenerator in amount to restrain fireclay brick, during their outward movement as a result of expansion under heat, when such region is composed of fireclay brick, to prevent the brick from opening up during such movement, since the amount of overall movement is insufficient to open up the brick joints. It should only be necessary to provide restraint to the thrust that is imposed on such brick when the silica brickwork rides on the fireclay brick whenever both are employed as a composite mass to constitute the upper coking chamber and heating wall and lower regenerative mass for coke ovens.

For such restraint it should suffice to provide additional resistance along each incremental part of the clay brickwork, from the outer face of the regenerators to the central part of the fireclay brickwork mass, to oppose the individual increments of thrust from the silica brick tier that rides on the top tier of the clay brick mass, and thus prevent the cumulation of such thrusts in the fireclay brick and thereby avoid any horizontal displacement of the individual clay brick due to the movement of the silica above.

To this end the present invention provides such restraint in an extremely simple and economical way. This is done by means of the simple device of using fireclay brick with tongue and grooves or equivalent well known interlocking means, whereby the top layer of clay brick on which the silica brick slides may be interlocked by the overlapping tongue and groove joints between such brick and those in the tiers below, and the fireclay brick bonded with thin joints of air setting mortar which by chemical action imparts great strength to the bond at the prevailing temperature. While the novel use in this invention of such a known bond will prevent the cumulative distortion of the top layer of fireclay by the thrust imposed by the silica brick where it rides on the clay, it, of course, does not prevent the cumulative expansion which takes place in the silica brick at the interface between the silica and the fireclay. Such cumulative expansion of the silica at such interface may still take place with its greater relative movement of the silica brick over the clay in the portions of the mass more remote from its vertical center. To this end, the top layer or tier of the clay is also covered with a thin layer of air-setting cement to smooth out any unevenness in the brick surface of the top layer of clay, which makes the surface on which the silica is to slide, when heated up, just as smooth as the concrete mat on which the same silica walls now slide with standard commercial designs which have the silica brickwork all the way down to the base of the regenerator which base rests directly on a concrete mat.

In this manner the silica will readily slide on top of the clay walls devoid of other bracing means for such clay portions at the outer faces of the regenerator walls, and without disrupting the clay walls or exerting excessive and destructive pressure thereon. To insure such sliding the covering layer of cement on the top surface of the clay wall may be, within a further aspect of the invention, also covered with a graphitic lubricating agent that will be relatively stable at the prevailing temperatures of 600–700° F., during heating up of the battery, to further facilitate the sliding of the silica thereon.

As the exact location along the regenerator walls, and the depth below the top layer of fireclay brick thereof to which the stresses and thrust from the silica brickwork may be felt, cannot be foretold or predicted in advance of operation of any battery so built, the entire fireclay brickwork mass is formed of brick all of which are interlocked by overlapping tongues and grooves, and bonded at their joints with air-setting mortar as aforesaid with those of a tier below, all the way down to the top of the concrete mat, as well as to the mat.

A wall laid up in the above described manner is deemed in the art to be exceedingly strong mechanically and to be practically impervious to gases, with the joints mechanically stronger than the brick. Such whole clay wall is a monolithic mass similar to concrete.

The temperatures prevailing in these standard cross regenerator ovens generally decreases progressively from 2200° F. at the oven chamber floor down to 1200° F. at the middle of the height of the regenerators, and to 1000° F. at a three foot level intermediate said middle of the height of the regenerators and the top of the sole flues. At the level of the top of the sole flue, the temperature falls to 750° F., and then drops to 400° F. at the top of the concrete mat. When fully expanded, the silica brickwork of the battery reaches its maximum possible expansion beginning at the middle of the height of the regenerators, a level about six feet above the base line of the regenerators, and the outside face of the silica brickwork expands a like amount from the oven chamber tops down to said level, so that the outside face of the silica brickwork from the top of the oven chambers down to said six foot level should be perpendicular. From this latter six foot level the outside face of the regenerator walls then recedes downwardly to the top of the concrete mat, being slightly less, about 0.2" less, at the three foot level, 1000° F. region, 0.4" less at the tops of the sole flues, and then recedes to 0.9" less at the 400° F. region, of the regenerators, which is at the level of the base of the sole flue at the top of the concrete mat.

This means that when buckstays are pulled tight against the brickwork at the base of the regenerators and at the top of the oven chambers, they will bend around the high point at the middle of the height of the regenerators as a fulcrum, at said level 6 feet above the base line of the regenerators. The portion of the buckstays above said six foot level will then bow or bend to a corresponding degree, since the degree of bending increases with the distance or length of the radius, or arch of curvature, of the lowermost point of the beam bent around said fulcrum. Imperfect bracing therefor results due to such bending.

In accordance with this invention, for bracing the silica portion of the battery with straight buckstays in the region which expands in a straight line between the top of the oven chamber and the six foot level of the regenerators, fireclay brickwork is incorporated in interlocked relation, and preferably as a monolithic wall, as a part of the regenerators as aforesaid, up to a level between the top of the sole channels and the six foot level of the regenerators, and the concrete of the mat is extended up to the top level of the fireclay brick in non-bracing relation therewith in the form of a continuous wing or curb wall alongside the side face of the battery to support the base of the buckstays at that level, for bracing the silica brickwork above said six foot level separately and independently of the fireclay brick portion as heretofore, but with the bottoms of the buckstays anchored to the concrete of the mat at the top of the wing or curb. In this manner the clay and silica portions are separately braced independently of each other while leaving the area below the tops of the sole flues free for installation of recirculation ducts and underjet ducts without interference with the bracing means for this region of the battery. The buckstays, being anchored at their lower ends at any of the levels between the top of the sole flues and the six foot level of the regenerators, will not bow to an extent from the vertical, when such eventuality occurs, to significantly effect disadvantageously the bracing of the heating walls alongside the coking chambers, since such points of anchorage move out sufficiently further toward the upper point of maximum expansion at said six foot level, than the portion of the battery below such levels, that the bending movement is sufficiently less than when the base of the buckstays are anchored, as heretofore, at a lower level having less outward expansive movement as a result of little thermal expansion when the battery is heated up.

With the lower ends of the buckstays anchored, within said range of levels above the base of the regenerators, between the top of the sole flues and six foot level, the buckstays will not bow or bend to any appreciable extent but will remain perpendicular and thus assure contraction and pressure on all tiers of brickwork from said six foot level up to the tops of the oven chambers. This would necessitate a six foot high curb wall. At the three foot level, the point of anchorage is only about 0.2" back of the fulcrum point at the six foot level, and as the difference in bowing of the buckstays from the vertical by anchorage at this three foot level is so insignificant that substantially all the results in bracing are attained by effecting the lower anchorage at said three foot level, anchorage of the lower end of the buckstays at said three foot level is preferred and contemplated as the best mode of carrying out the invention, since it requires only a three foot high curb wall. As a next best mode, anchorage at the level of the tops of the sole flues is next preferred since it requires a curb wall only one foot high while maintaining much of the advantage of straightness for the buckstays along the heating walls.

In the preferred embodiment of the invention, the improvement is incorporated in a modern cross regenerative horizontal coke oven battery of the crossover flue interconnected vertical combustion flue type mounted on a concrete mat above an accessible basement space, and provided with rich gas supply means in the basement space for supply of rich fuel gas to the vertical combustion flues via underjet rich gas riser conduits or ducts leading individually from the basement space upwardly to the bottoms of the vertical flues through silica regenerator walls provided with the novel wing or curb walls for bracing the silica walls and with the novel tier interlocked clay bases. The rich gas riser channels or ducts of the flues interconnected by crossover flues are connected with each other by claybrick recirculating ducts immovably embedded in the concrete of the oven mat below the top of the same and extending from one regenerator wall to another underneath the claybrick sole channels of intervening regenerators. The recirculating ducts extend longitudinally of the battery and are spaced from each other crosswise of the battery to serve a pair of rich gas risers on opposite sides of each end of each recirculating duct in the duct interconnected regenerator walls. The ends of the recirculating ducts connect centrally with a branch duct in the concrete mat terminating in upwardly open outlets which extend upwardly to the top of the mat and terminate flush with the top of the mat. The rich gas riser channels are located in the regenerator walls in the vertical planes of vertical combustion flues in the heating wall above. Each underjet duct or gas riser channel of a pair on opposite sides of a recirculating duct is provided with a venturi in the region of the regenerator wall at a level below the tops of the sole channels and each pair of gas riser channels terminates in a downwardly opening common inlet flush with the base of the regenerator wall, to register with the upwardly opening outlet of the recirculating duct in the mat. With tops of the novel non-curb braced clay bases at the 1000° F. three foot level of the regenerators where the movement of fireclay brickwork is very slight relative to the concrete mat, since at that region the coefficient of expansion of clay is not more than that of the concrete at the same temperature, there is provided, as shown on the drawings, sufficient space in adequately interlocked brickwork of clay below the level of the tops of the sole channels for the rich gas risers or underjet ducts to be interconnected in pairs to incorporate them for coaction with the recirculation duct when immovably located at a fixed point in the mat, as in the first patent 2,306,678, and yet allow for centering action of the rich gas riser pipes provided with nozzles, to maintain them in alignment with the rich gas riser channels or underjet ducts in the walls, during movement of the regenerator walls relative to the supporting concrete mat when heated, with requiring underjet gas riser pipes to have a fixed connection with the silica brick of the regenerator walls, as my Patent 2,507,554 of May 16, 1950.

In a next preferred embodiment of the invention, the improvement is incorporated in the same type of oven as the above preferred embodiment but modified to have the tops of the non-curb braced clay base of each regenerator wall at the 750° F. level of the tops of the sole channels in which case the curb will be only one foot high.

The invention, however, is not limited in all its aspects to use of the novel features and attributes of the invention in conjunction with the above noted preferred and next best modes of the crossover flue interconnected combustion flue type of coke oven battery, since many of the novel features of the invention are of like utility with other types of heating flue systems involving concurrent "on" and "off" operation of rich gas risers in regenerator walls separated by regenerator chambers and requiring the waste gas recirculating duct beneath the regenerator chambers to induce recirculation of waste gas from a downflow vertical combustion flue through its idle "off" rich gas feed channel into the "on" rich gas feed channel in another regenerator wall on the other side of an intervening regenerator chamber, for dilution of the rich gas before it enters the combustion flues on the opposite side of an intervening coking chamber, under the pressure of flow of the entering rich gas from a basement beneath the oven mat. Such other types may be modified underjet oven batteries of the type of H. Koppers Patent 818,033, or the Berthelot Patents 1,340,104 and 1,361,671, and also other like ovens in this art such as ovens of the "gas gun" type of said patents as well as "hairpin" flue type ovens. Hence, the invention is not confined in all its aspects to the best modes herein described and illustrated as the preferred and next best embodiments.

Other objects and advantages of the invention will be apparent from the following description and the accompanying drawings forming a part thereof.

Referring to the drawings.

The same characters of reference designate the same parts throughout the several views of the drawings.

In the embodiments thereof illustrated in the drawings, the various features of the invention are shown incorporated in a battery of combination ovens of the well-known Becker type of which a prominent characteristic is crossover ducts that are disposed to flow combustion-products as they issue from vertically disposed heating flues of an oven heating wall over the top of an adjacent coking chamber and into similar and similarly positioned heating flues of a heating wall adjacent the opposite side of said coking chamber, but it will be understood from the following discussion of the features of the invention that they are especially susceptible of employment to the advantage of any coke oven structure having in its heating system vertically disposed heating flues with their tops interconnected for purposes of gas flow in opposite directions. As a specific example of another class of ovens in which the invention can be successfully exploited there may be mentioned those of the aforesaid H. Koppers and Berthelot patents whose heating flues are arranged according to the so-called single and double dividend construction.

Referring now to the drawings, the preferred embodiment of the instant improvement shown in Figs. 1 and 7 to 10 is constructed the same as that shown in the next preferred embodiments as illustrated in Fig. 2–6, the preferred embodiment of Figs. 1 and 7 to 10 differing from the oven shown in Figs. 2 to 6 solely in the feature of having the lower clay bases and the concrete wing or curb wall and the lower anchor for the buckstays, at the three foot level rather than at the top of the sole flues. In both embodiments, the illustrated Becker type coke oven battery comprises a plurality of coking chambers 10 and heating walls 11 that are disposed in alternation lengthwise of the battery. Heating walls 11 comprise longitudinal partition walls 8 forming a plurality of vertically disposed heating flues 12 that are arranged side by side crosswise of the battery and are adapted for gas flow purposes in groups of which each comprises, with the exception of the two flues at either end of each heating wall, four heating flues having a common crossover duct 13 whereby combustion products of one such flue group are flowed upward and over the top of a coking chamber 10 and into a corresponding flue group adjacent the opposite side of an intermediate coking chamber. Each such group of four flues is structurally subdivided into pairs of flues of which each pair is provided with a common horizontal flue outlet 14 and each pair of flue outlets for a flue group are symmetrically disposed in respect of a said crossover duct. The two heating flues at either end 40, 41 of a heating wall 11 are furnished with their individual crossover which is proportioned to accommodate the combustion products produced by the larger amounts of underfiring gas burned in flues at that location for the purpose of overcoming the greater radiation from the heating wall ends; any other preferred number of heating flues can, of course, be connected with the end crossover ducts.

The heating flues of the heating walls each communicate individually by conduits 15 with two cross regenerators 16 therebeneath, each such regenerator being arranged to preheat combustion air at such times as the heating flues are being underfired with non-regeneratively preheated flue gas as, for example, obtains when the ovens of the battery are operated as "coke ovens." One of the regenerators of the pair of regenerators with which each heating flue is communicably connected is, however, also adapted to preheat lean fuel gas delivered thereinto from its sole channel 7, at the base of the regenerator and contiguous with the top of the concrete mat 20, from a lean fuel gas main 17 and gas flow box 18 in the well known manner in those instances where the ovens are operated as "gas ovens" and are therefore underfired with extraneously derived gas. In the underfiring of the heating flues with either regeneratively preheated or non-regeneratively preheated fuel gas, they as well as their combustion air are all introduced into the lower parts of the heating flues exclusively and each at but one level thereof, so that their combustion is initiated at substantially only one place. This type of underfiring will be hereinafter referred to as "one stage" combustion.

Figure 1:
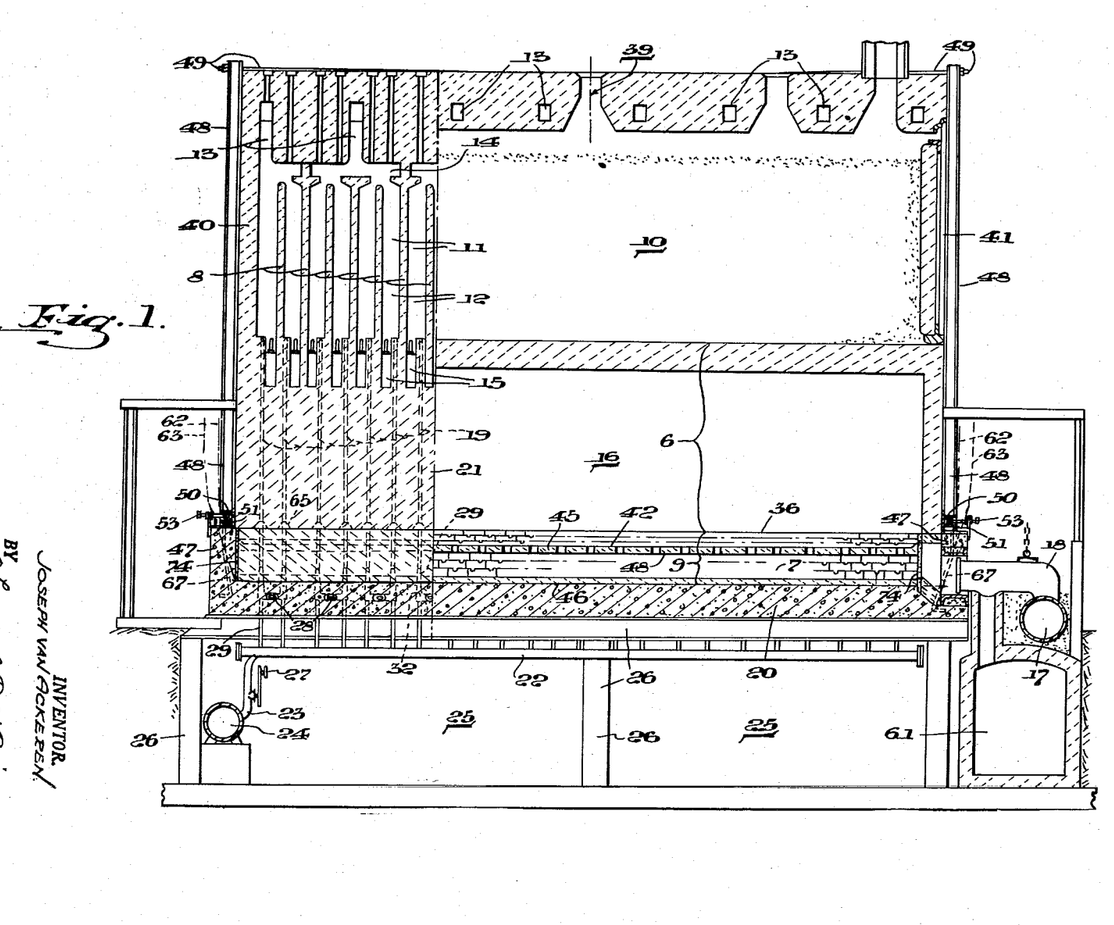
Fig. 1 is a vertical elevational section taken crosswise of a battery of underjet coke ovens embodying the preferred or best mode of embodying the present improvement, said section being taken in part through a heating wall and in part through the adjacent coking chamber in the cold condition.
Figure 2:
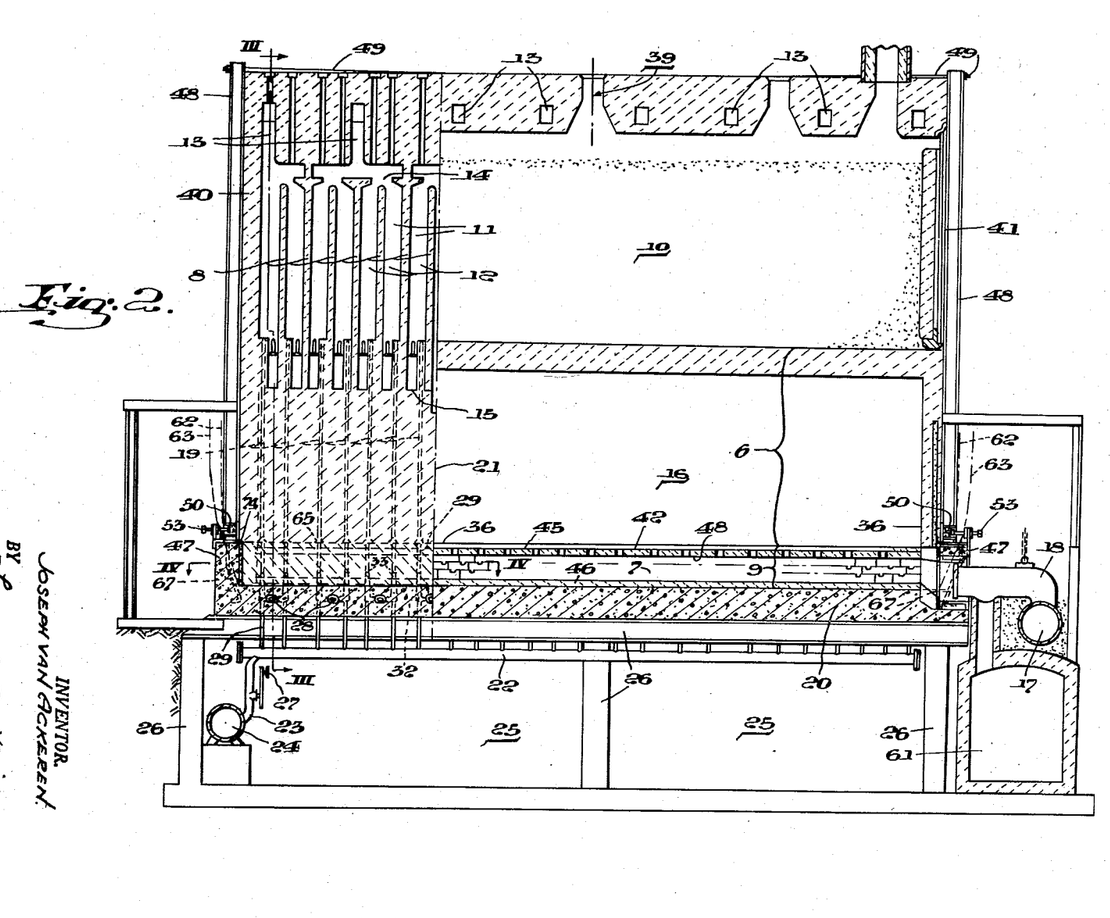
Fig. 2 is a like vertical elevational section taken crosswise of a battery of underjet coke ovens embodying the next preferred embodiment of the present improvement.

At such times as the batteries illustrated in Figs. 1 and 2, are operated as "coke ovens" and are heated by rich fuel gas of higher calorific value that needs no preheating step for its effective combustion, such rich fuel gas is delivered into the bottom of the heating flues according to the underjet principle by means of gas riser channels in the form of ducts 19 that extend from the lower surface of the concrete supporting mat 20 of the battery upwards through a regenerator wall 21 comprising silica brick 6, and provided with a clay brick base 9 between the level of the top of the concrete mat and the level of 1200° F. middle height of the regenerator walls 21, to port into the lower parts of the heating flues. Each such duct 19 communicates, by means of pipe connections 29, with a wall header pipe 22 whereby all the vertical heating flues comprising a single heating wall are simultaneously supplied with the heating gas of high calorific value. Each such wall header pipe 22 of the battery in turn communicates through its pipe connections 23 with a principal supplying main 24 that extends lengthwise of the battery through basement passageways 25, formed beneath mat 20 by the battery supporting beams and piers 26, and communicates with a reservoir of rich gas outside the battery structure. Valve means 27 is adapted for actuation by the gas flow reversing mechanism (not shown) of the battery to supply fuel gas to its associated heating wall in alternation with a heating wall thereadjacent.

Figure 3:
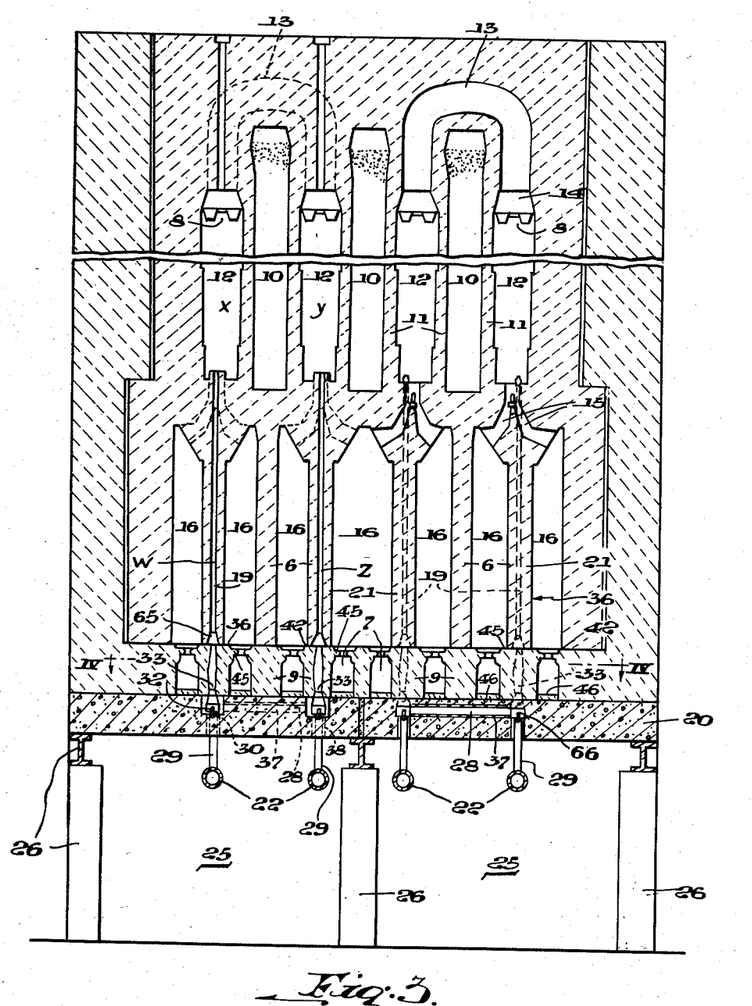
Fig. 3 is a vertical section taken longitudinally of the battery shown in Fig. 2, the section being taken along the lines III—III of Figures 2 and 4.
Figure 4:
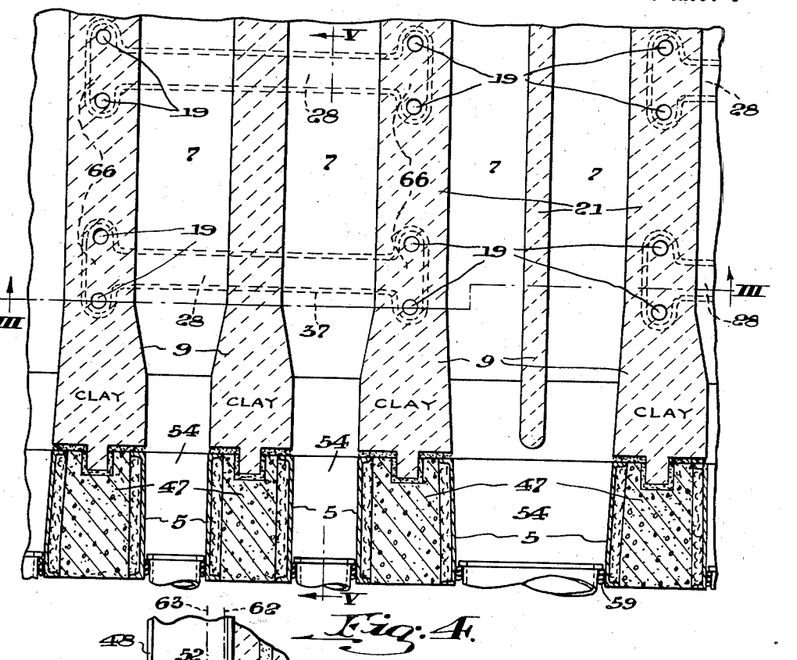
Fig. 4 is a horizontal section of Fig. 3, the section being taken through the regenerator sole flues on the line IV—IV of Figs. 2 and 3.
Figure 5:
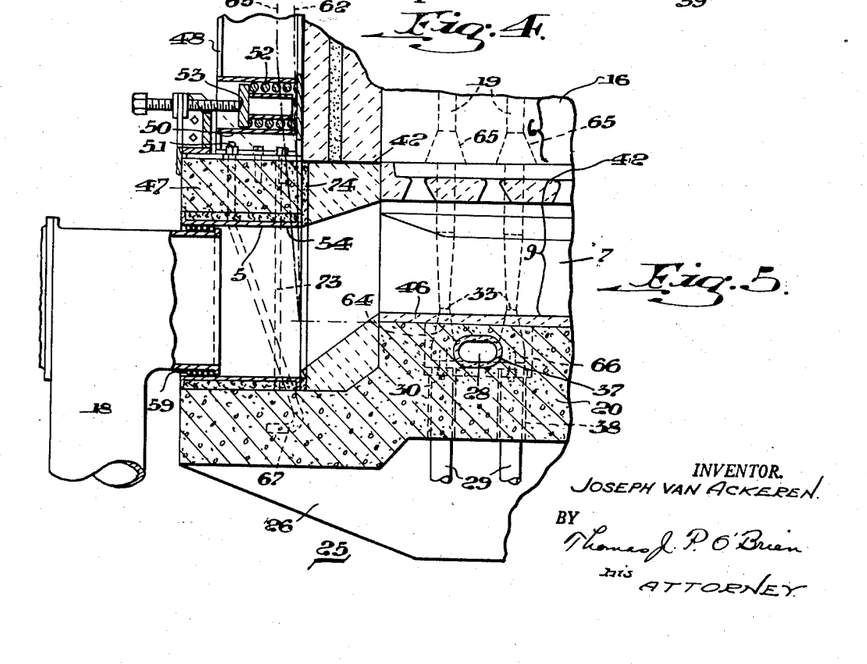
Fig. 5 is an enlarged vertical section taken on the line V—V of Figs. 4 and 7.
Figure 6:
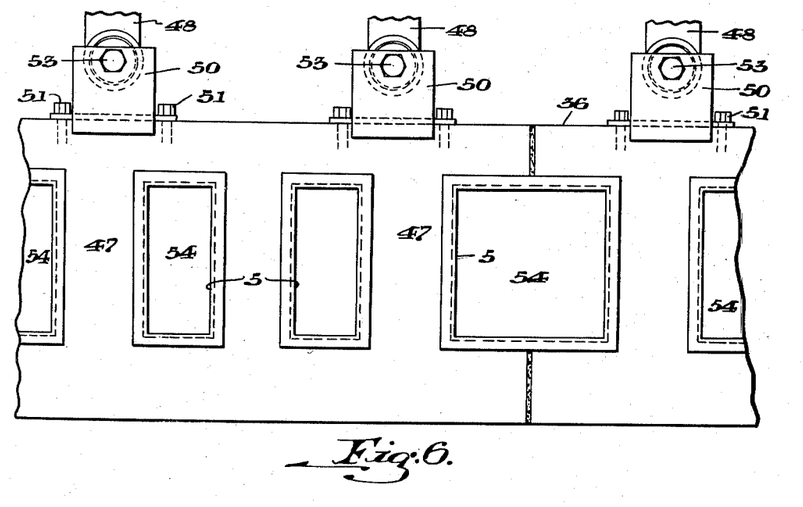
Fig. 6 is an end elevational view of Fig. 4.
Figure 7:
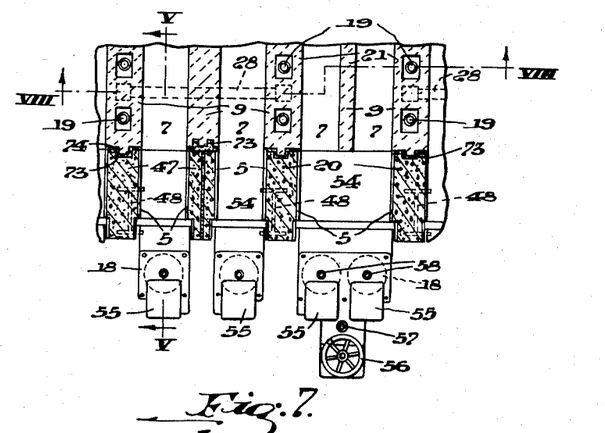
Fig. 7 is an enlarged detail vertical section of a portion of the battery as shown in Fig. 1 but illustrating the same in more detail in fully heated up and expanded condition.

In accordance with the instant improvement, as clearly shown in Fig. 3, the two underjet ducts 19 that are associated with corresponding vertical heating flues of adjacent heating walls employing the same crossover duct 13, are communicably connected adjacent their lower ends by means of recirculating ducts 28 having branches 66 located in the concrete mat 20, said recirculating ducts thus providing means whereby a circulation of gases is established between the lower parts of the heating flues connected thereby. Recirculating ducts 28 are entirely surrounded by the concrete material of the mat, as shown in said Figs. 1, 2 and 3, adjacent either the upper or lower surface thereof. The said recirculating ducts are made of high duty clay liner sections 37.

Rich fuel gas contained under pressure in the wall header pipes 22 of the distributive system therefor is allocated individually to each heating flue of an associated heating wall by means of pipe connections formed into a branch riser pipe 29, said branch riser pipe having its outlet end removably inserted into the lower part of underjet duct 19 along which it extends to a point substantially at the level of the bottom of the recirculating duct 28.

The rate at which rich fuel gas is delivered into the individual underjet duct 19 and by them conducted into the heating flues is controlled by means of the gas flow nozzle 30, Fig. 3, which can be secured at a preferred point so that the position of its discharge orifice 32, Fig. 3, is adjustable in respect of the narrowest central portion of the venturi member 33. Rich fuel gas enters the vertical heating flue 12 above in quantities determinable, amongst other factors, by the area of orifice 32 and also by the pressure under which said gas is maintained in the wall header 22. Nozzle 30 being replaceable, the amount of fuel gas delivered to the heating flue above is optionally variable either by substituting for an existing nozzle a like nozzle having an outlet of different effective area or by altering the gaseous pressure maintained in the associated wall header 22. From end 40 to end 41 of the heating wall, the orifices 32 of nozzles 30 are preferably graduated in accordance with the taper of the adjacent coking chamber and the thereby occasioned diverse heat requirements of its coal content at different points therealong.

By means of the described gas flow regulating means, rich fuel gas is injected into the underjet ducts 19 in the form of a jet which exerts an ejector effect on gases contained in the recirculating ducts 28 and causes them to flow upwardly with the jetted fuel gas and to admix therewith as a diluent. When, in Fig. 3, the underjet duct W is delivering fuel gas to the flue X thereabove, its corresponding heating flue Y of the adjacent heating wall and with which said flue X is communicably connected not only by crossover duct 13 but also by means of underjet duct Z and a recirculating duct 28, is filled with combustion products flowing downwardly to outflow regenerators. The said underjet duct Z and its associated recirculating induction duct 28 are thus filled with combustion products derived from the top of heating flue X through crossover 13 and heating flue Y. In consequence, therefore, of the jet of rich fuel gas rising through underjet duct W, those gases induced to flow through recirculating ducts 28 are actually combustion products of rich fuel gas previously burned in flue X. Inasmuch as these combustion products are relatively inert, their mixing with the rich fuel gas as they rise through duct W has the effect of introducing into the lower part of heating flue X a fuel gas of lower calorific value and slower combustion characteristics than would otherwise obtain. This has the beneficial effect of making it possible to maintain a reduced temperature gradient between the tops and bottoms of the heating flues and so promotes uniformity of heat distribution throughout the adjacent coal charge. As is obvious from the drawing of Fig. 3, reversal of flow of gases through the flues X and Y in no way alters the results obtained.

The apparatus thus furnishes means whereby a rich fuel gas can be continuously and automatically diluted with an inert gas inside of the battery structure and before it enters the heating flues, thus making it possible to retard the combustion rate of a rich fuel gas and to obtain the benefits of underfiring with a gas of optionally regulable low calorific value without increasing the load of recirculated combustion products flowed through the regenerators or disturbing the normal flow through the heating flues of the columns of fuel gas and air introduced at their lower parts.

The combustion products, drawn downwardly from the heating flues through the underjet ducts 19 by means of the jet of rich gas, are subjected to considerable cooling by the walls of the regenerators and their sole channels 7, so that said jet operates on gases having viscosities greatly reduced from those they exhibit when in the heating flues; this fact importantly facilitates their induction into the upflowing underjet ducts by the jet of fuel gas. Their temperature is however not reduced below the dew point of their moisture content and the presence of this water vapor along with their carbon dioxide and small oxygen content acts as an agent that so adequately hinders the accumulation of carbon deposits in the underjet ducts that a decarbonizing step therefor is usually not necessary.

The recirculating ducts 28 are composed of fireclay pipe sections 37 which are encased in the concrete of the mat 20 in end to end relation, and the mat is provided with through passages 38 to accommodate the movement of the gas riser pipes 29 and their nozzles 30 in the mat 20.

When heated up, clay base 9 expands cumulatively only very slightly from the longitudinal vertical central plane 39, Figs. 1 and 2, of the battery towards its two opposite sides 40, 41, the expansion being no more than that of the concrete mat 20 on which the clay base rests. The concrete mat expands about .252" whereas the clay expands at the top of the mat about .215" and to a slightly greater extent, about 0.4", at the level of the top 42 of the sole channels 7. At each side 40, 41, the silica brickwork 6 if carried down in the wall 21 to the level of the top 42 of the sole channel 7 will expand so as to move out beyond the clay base about 2½". The brickwork 6 therefore must be pre-designed, in such case, to be erected in the cold so as to have the interconnecting passages 19 offset from those parts 29 thereof, in the clay base 9 and in the mat 20, in different degrees from the center 39 outwards toward the sides 40, 41, of the battery to ensure their proper register when the battery is fully heated up.

When the clay brick base is carried out in the regenerator wall up one quarter of the height of the regenerators, to the level 36 of the 1000° F. three foot level, of the regenerator, to support the rest of the wall in the form of silica brick above that level, the silica brickwork at the three foot level will expand at each side of the battery 2.7" in contrast to the .66" of the clay brick at that level. This difference in expansion is slight enough for spacing of the portions of the passages 19 in the silica so as to register with the portions 29 of the passages in the clay bases 9 at the three foot level, when the oven battery is fully expanded.

The same is true should the clay brick base to be carried up in the wall to the level of the 1200° F. middle height of the regenerator chamber, measured from the base line of the sole flue at the top of the concrete mat 20, since at this level the silica expands in overall length at each side of the battery 2.9" in contrast to .83" for the clay brick.

In accordance with the present improvement, the lower clay portion 9 of the regenerator walls 21, below the 1000° F. three foot level 36 of the regenerators in the preferred embodiment of Figs. 1 and 8, and below the 750° F. one foot level 42 of the tops of the sole flues 7 in the next preferred embodiment as in Figs. 2 to 6, are constituted of first quality claybrick, while the upper portion of the walls 21 and the heating walls and coking chamber liner surfaces are constituted of silica brick 6. The rider tiles 45 forming the tops of the sole flues 7 are thick clay slabs which are supported on the clay portion 9 constituting the base of the walls 21 being formed as an integral part of the bricks of the latter. The base of the sole flue area is lined by thinner clay brick slabs 46. The conventional side clay liners for the sole flues 7 are no longer needed, since the sides of the clay base 9 serve to form the clay side faces of the chamber space of the sole channels 7, thus providing wider sole flue chamber areas with a reduction of about an inch in height of this chamber area, thereby further reducing the regenerator height and hence the total height of the battery, which represents a considerable saving.

Figure 8:
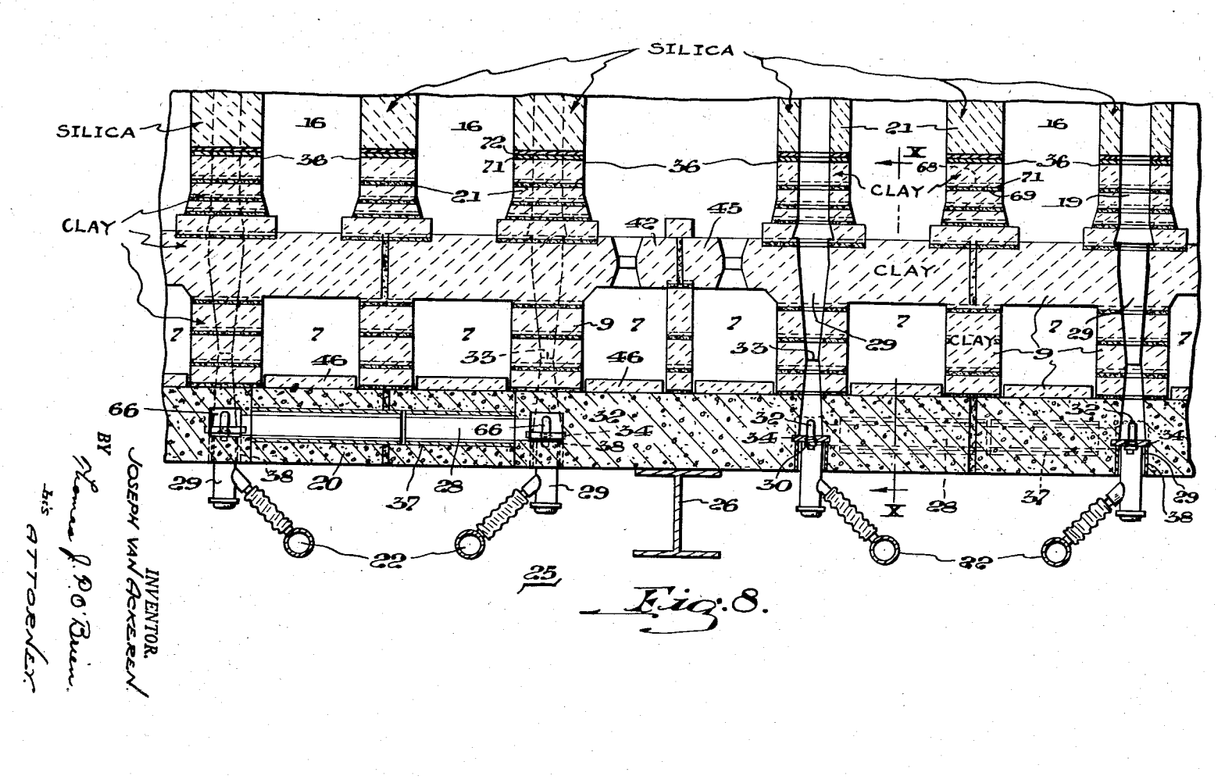
Fig. 8 is an enlarged detail vertical section of a portion of the battery taken on line VIII—VIII of Fig. 7.

The silica portion 6 above the clay brick base portion 9 of the walls 21, and the sole flue brick 45, 46, are restrained from outward movement independently of the expansion of the clay base 9 by extending the concrete oven pad 20, at each side face 40, 41, of the battery, up to the level 36 of the 1000° F. three foot level of the regenerators, in the preferred embodiment of Figs. 1 and 8, and up to the level of the top of the sole flues 7, that is, to the 750° F. level of the tops 42 of the slabs 45 in the embodiment of Figs. 2 to 6, to form a continuous wing or curb wall 47, to constitute the seat or base for the support of the buckstays 48 in vertical position alongside the ends of silica portion 6 of the regenerator walls 21 and the heating walls 11. The upper ends of the buckstays are tied together by the rods 49 and their lower ends are anchored to the mat at the top of the wing or curb wall 47 by brackets 50, secured at 51 to the top of the curb 47. The brackets 50 comprise a spring 52 in engagement with the buckstays, and a screw bolt plunger 53 for adjustment of the buckstays as the oven brickwork expands. The curb 47 is constituted of conventional reinforcements as indicated at 67.

Rectangular openings 54 are provided in the wing or curb wall 47 in endwise alignment with the sole flues 7 and the reversing boxes 18. These openings are made in the concrete by using permanent steel plate forms 5, which also serve to protect the concrete when in actual operation with the conventional reversing boxes 18, which have, as usual (Fig. 7), an air inlet lid 55, a lean gas valve 56, a gas reversing valve 57 and a waste heat reversing valve 58. The reversing box has, as usual (Fig. 10) sliding duct connections 59 and 60 to the sole channels 7 and to a waste heat tunnel 61, respectively. These appurtenances are all in the region of the side face of the battery between the top of the curb 47 and the base of the concrete pad 20.

The anchoring of the buckstays 48 at the top of the curb 47 allows for simplicity in design of the reversing boxes 18, improved packing conditions for the boxes, improved and greater ease and facility in accessibility to the anchor mechanism for the lower ends of the buckstays, a reduction in length of the reversing boxes allowing more space for installing the lean gas main, and reduction in length of the expensive buckstays.

Figure 9:
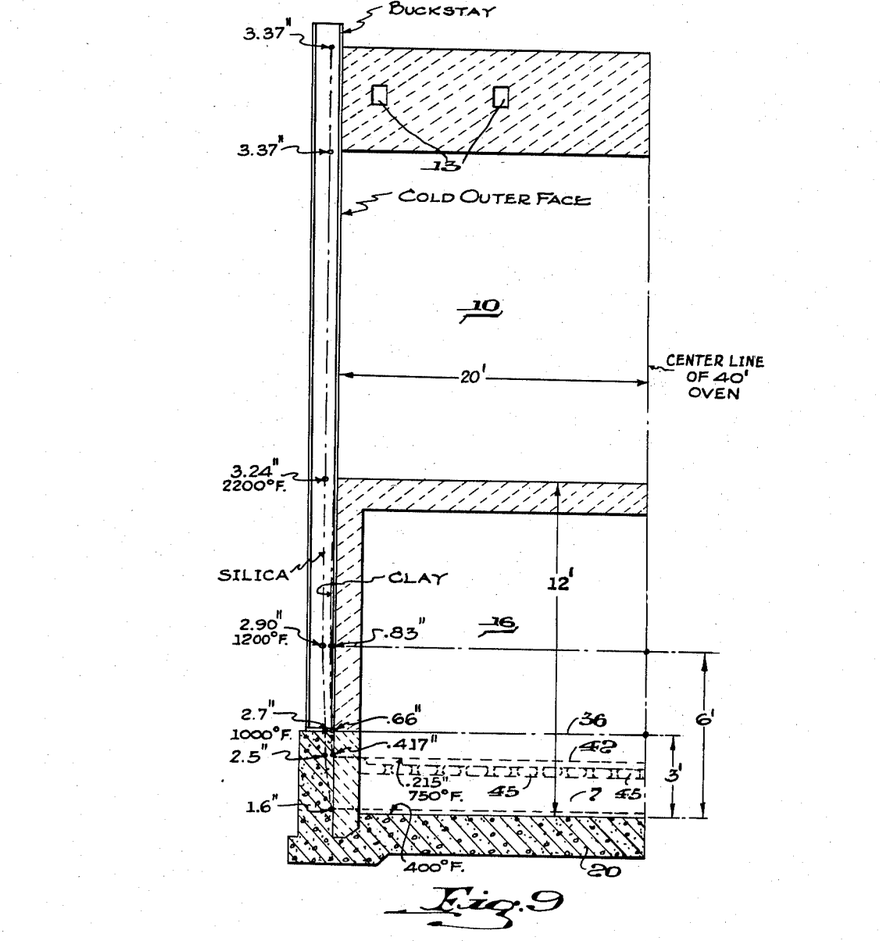
Fig. 9 is a diagrammatic view indicating the relative positions of the side of the battery, in relation to its cold condition, when expanded with clay and with silica as the brickwork mass.
Figure 10:
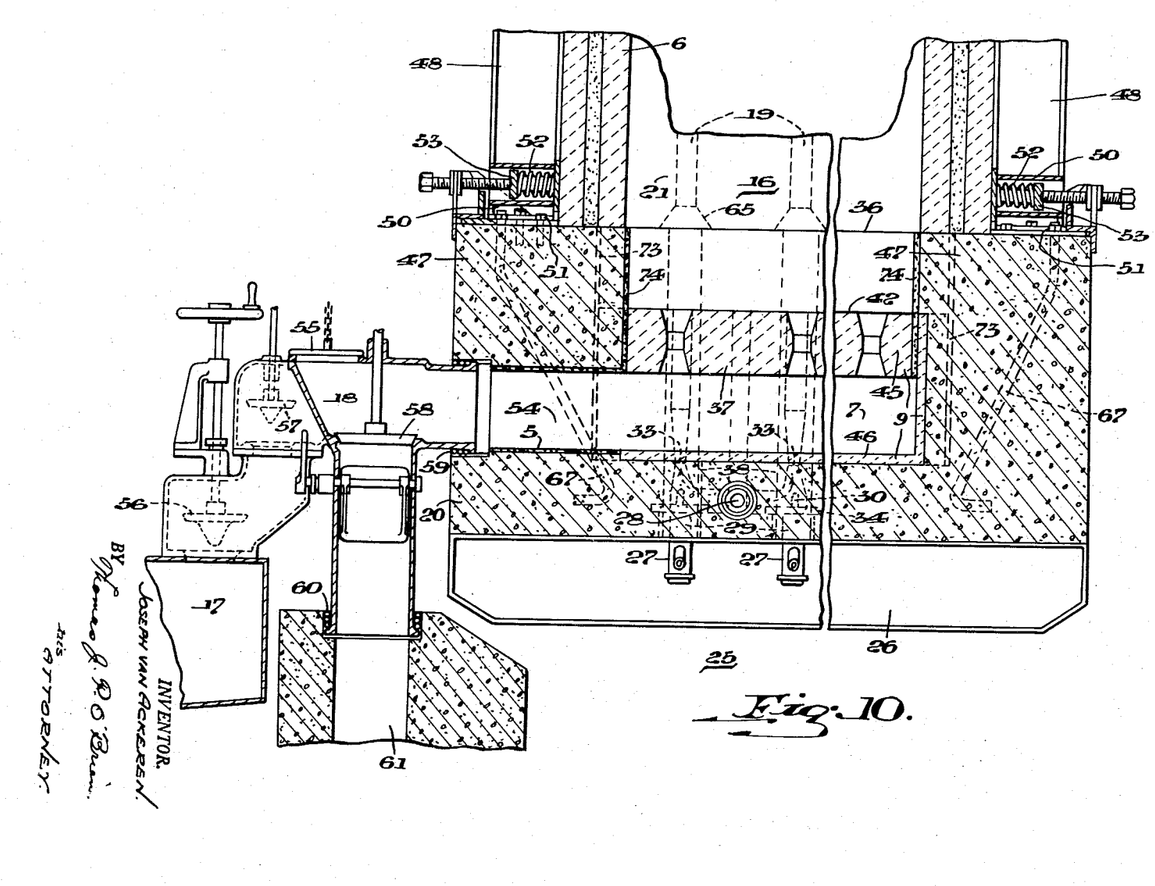
Fig. 10 is a partial sectional elevational view of a portion of Fig. 7.

A further particular advantage in this curb bracing of the upper part of the regenerator division walls and the oven supporting walls 21 independently of the clay bases is that the degree of bowing that may occur in the buckstays 48 as a result of the expansion of the oven is materially reduced. With silica brick, the lowermost point of the maximum movement of the battery under expansion, about 2.9" occurs in the region extending from the top of the oven chambers down to the 1200° F. middle height of the regenerators. The ends of the regenerator walls from the 1200° F. level down to the level of the 1000° F. three foot level of the regenerators expands approximately to the same extent, about 2.75 inches, and at the 750° F. level at the top of the sole channels silica expands to slightly a lesser extent 2.5 inches. In the region from the tops 42 of the sole flues 7 to the top of the concrete mat 20 the masonry expands a much lesser extent when composed of clay, about .41" to .21" than the silica portion which expands about 2.5" to 1.6" between the tops of the sole flues 7 and the top of the concrete mat 20. Thus the degree of bowing, as indicated by line 62 for the present invention is much less than the degree indicated by line 63 in ovens as heretofore built, with the lower ends of the buckstays 48 anchored according to the present invention at the levels 36 and 42, than when extended down to the base of the sole flues 7 and anchored there to the top of the mat inbetween the reversing boxes 18.

In both embodiments of Figs. 1 to 8, each venturi 33 is advantageously located in the clay base portion 9 of the regenerator walls 21, and the recirculating duct 28 and the nozzles 30 are connected together in the concreate mat 20. No difficulty is encountered in centering of the nozzles 30 with the venturi 33 when the oven is heated up, since the thermal coefficient of expansion of the concrete 20 is only slightly more, .00000385 in./in./° F. than the thermal coefficient of expansion of the clay 9, .0000031 in./in./° F. As a result the oven can be erected cold with each venturi 33 offset slightly from the outlets 64 (Fig. 5) from their branches 66 of circulating ducts 28, with assurance of their alignment when the oven is heated up. For recirculation of waste gas, reliance is on the pressure of the gas as it discharges into the venturi 33 to aspirate waste gas from the heating flues by way of the "off" rich gas risers 19 and ducts 28 into the "on" rich gas risers 19. Such pressure will have spent itself for that purpose before the gas reaches the level 42 of the top of the sole channels 7. Hence to ensure exact centering alignment of the base portions 65 of the risers 19 in the wall 21, it is not essential that the brick be clay or silica brick, at the junction of the base portion 65 with the top of the portions of risers 19 in clay brickwork in the region below the tops of the sole channels. When silica brick is employed down to the level 42 of the top of the sole channels of the oven supporting regenerator division walls 21, the lower ends of the silica portion of the risers 19 are flared, as conventional, as shown at 65 for purpose of registration with the venturi portion 33 in the clay base 9 at the sole channel area.

Figure 11:
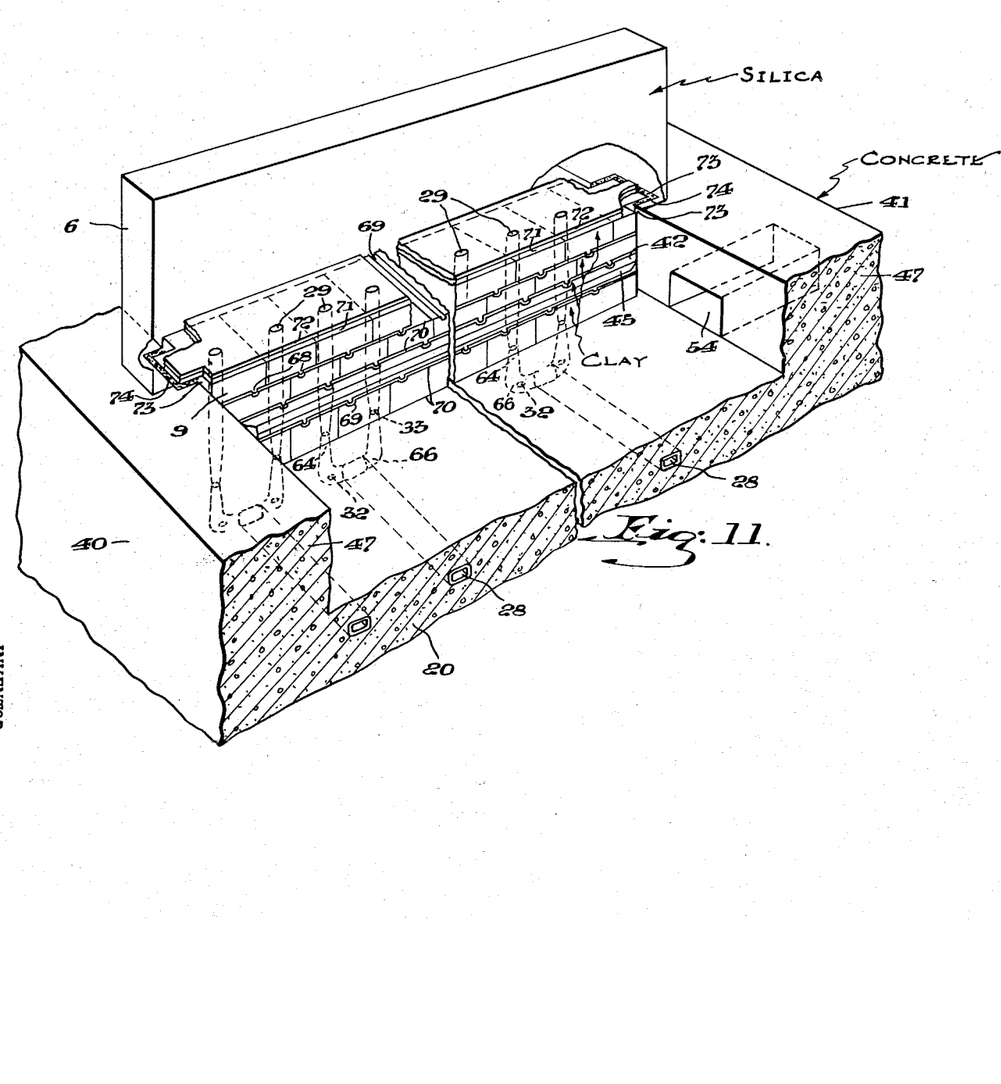
Fig. 11 is an isometric elevational sectional view showing the monolithic base portion of the regenerator wall.

The clay brick base 9 is constituted of superposed tiers of clay brick interlocked by overlapping tongues 68 and grooves 69 in adjoining surfaces of each two adjacent tiers of clay brick. The tongues 68, being integral with a brick in one tier, rests in a groove 69 in the body of a brick in a next tier. In this manner any horizontal displacement of individual clay brick in a direction crosswise of the battery, due to movement of the silica wall portions above, is impossible. In addition, in the preferred form of the invention, it is contemplated that the clay brick be bonded with thin joints 70 of a conventional airsetting mortar which by chemical action imparts great strength to the bond at the prevailing temperature under operation of the battery at full coking heat. It is also within the contemplation of the invention that any unevenness in the brick surface of the clay wall area 9 be smoothed out with a thin layer 71 of said conventional air setting cement which will make the top surface on which the silica is to slide just as smooth as the concrete on which the silica walls slide in conventional ovens built with the silica brickwork all the way down to the top of the concrete mat 20.

The invention also contemplates covering the top surface of the clay wall with a graphitic lubricating agent 72, or other lubricating equivalents, that will be readily stable at the prevailing temperatures during heating (600–700° F.), which will facilitate with certainty the sliding of the silica wall portion 6 on the top of the clay wall portion 9 without disrupting the clay walls and without exerting excessive and destructive pressure against the concrete curb wall.

Such a clay wall so laid up is exceedingly strong mechanically and is practically impervious to gases, and the joints are mechanically stronger than brick. In fact the whole clay wall becomes a monolithic mass similar to concrete.

The invention also contemplates the interclocking of the clay tiers together by means equivalent to said tongue and grooves, such as by means of grooves in the upper and lower sides of bricks in adjacent tiers to receive wall anchoring parts in the form of bars of suitable heat resistant metals received in the channel formed by the registering grooves in the top of a lower and the bottom of an upper bricks in adjoining tiers. Each part may be connected by a wire, or rod, to another, whereby to give anchorage to prevent displacement by the sliding action of the silica wall above.

It will be understood that the clay portion of the walls 21 will not exert any pressure against the concrete wing or curb walls 47 when the silica 6 expands, since the clay portion of the walls will expand no more than the concrete mat 20, on which the walls rest, under the normal heating up operation of the masonry mass structure.

However, the invention contemplates, to provide against fortuitous and unexpected expansion under abnormal heat conditions, such as those that may arise during the life of operation of the oven mass for coking of coal, the incorporation of the clay base 9 on the concrete mat 20 with an expansion recess joint 73 between the wing or curb walls 47 and the clay 9 of the regenerator walls 21, said recess 73 being tamped full with a compressible material 74 well known in the art, such as "Fiberfrax" which is an aluminum silicate made by the Carborundum Company for the specific purpose of sealing expansion joints in brickwork at temperatures up to 2300° F. This material is far more impervious to gases than even silica brick. These recesses 73 are preferably of the well known right angular slip and open expansion joint type.

In operation, the concrete mat 20 with the curbs or wings 47 at the two longitudinal sides 40, 41 is cast first and then the clay brick base 9 is likewise formed as aforesaid and the mortar and cement work 71 allowed to set into a monolithic mass in the cold. Thereafter the silica masonry 6 is laid on the pre-set clay masonry 9 in vertical alignment with the outer faces 40, 41 of the clay walls, and then heated up to operating conditions in the usual and customary manner.

A particular advantage of a coke oven so built or constituted is that no special precautions or means for artificial hot gas circulation through the circulating system during the heating up period are required as the clay is not subject to expansion difficulties such as may occur with an all silica construction.

A further advantage of such a coke oven is that the ovens can undergo great changes in coking speed without danger of brickwork contraction and leakage in lower temperature sole flue region 7. Periods of long coking time, if repeated often enough, may result in leakage of air into the venturi aspirator ducts 33 when using all silica construction and spalling of silica due to excessive temperatures in the gas ducts caused by combustion therein may result. Such possibilty is avoided by the novel clay base system. Any fortuitous combination as may unforeseeably occur will not result in destructive pressure on the curbs or wings 47 by the expansion of the clay 9, since most of the force of such expansion will have expended itself in closing the recesses 73 by compression of the packing therein. Hence little, if any, of the residual forces of expansion will ultimately arrive in the curbs or wings 47, and the upper silica portion braced by straight buckstays 48 independently of the expansion of the clay base 6.

Data referred to herein is based on standard reference works as follows:

Coefficients of thermal expansion used for—

Fireclay brick ________ .0000031 in./in./° F. (32° F.–2000).
   Source__________ "Refractories" by F. H. Norton, page 530.
Pozzolanic concrete ___ .00000385 in./in./° F. (75–510°).
  1 part Portland BF
    slag cement____ R. H. Anwyl—Koppers Research
  2.5 parts sand____ Dept., Project D–153—July 13,
  3.5 parts BF slag__ 1953.
Silica brick __________ Expansion curve attached average data from Harbison-Walker Refractories Co.

| Material | Temperature, °F. | Expansion (from center line of battery), inches |
|---|---|---|
| Pozzolanic Concrete | 200 | .115 |
| Do | 400 | .252 |
| Fireclay Brick | 400 | .215 |
| Do | 750 | .418 |
| Do | 1,200 | .838 |
| Silica Brick | 400 | 1.584 |
| Do | 750 | 2.496 |
| Do | 1,200 | 2.904 |
| Fireclay Brick | 1,000 | .608 |
| Silica Brick | 1,000 | 2.771 |

Expansion for typical battery at 1"/hr. coking time and average flue temperature of 2300° F. (based on Contract 2018):

At oven floor __________ 3.24 in.  
At oven roof __________ 3.37 in.  } From centerline of battery.  
At battery top __________ 3.37 in.  
At top of concrete pad __ 2.66 in.

The invention as hereinabove set forth is embodied in particular form and manner but may be variously embodied with the scope of the following claims.

I claim:

1. A regenerative coke oven battery, comprising: an upper masonry mass of brick constituting a series of alternate horizontal coking chambers and intermediate heating walls arranged side by side in a row, each heating wall comprising vertical combustion flues, and a lower masonry mass of brick constituting a series of crosswise extending regenerators separated by oven supporting regenerator walls below and parallel to the coking chambers and heating walls and resting on a concrete oven supporting mat with horizontal sole flue channels interposed between the bottoms of the regenerators and the top of the concrete mat, said upper and lower masonry mass being composed of silica brick from the oven roof down to a lower level between the 1200° F. middle height of the regenerators and 750° F. level of the tops of the horizontal sole flue channels and said lower masonry mass being composed of superposed interlocked tiers of clay brick from said lower level down to the top of said concrete mat with overlapping anchoring parts and channels therefor in the bricks of adjacent tiers to restrain the clay bricks from movement under thrust imposed thereon when the silica masonry above expands under heat, said concrete mat having a concrete extension, in the form of a continuous curb alongside the side faces of the battery, extending up to said lower level to terminate at its top at the level of the top of said clay brick, and buckstays anchored at their lower ends at said lower level to the concrete of the mat at the top of said curb and extending upwardly to the top of the battery alongside the ends of said regenerator walls and heating walls at opposite sides of the battery and provided with tie means for drawing them together at the top of the battery, for bracing the silica portion of the oven masonry mass separately and independently of the clay portion of the oven masonry.

2. A regenerative coke oven battery as claimed in claim 1, and in which the aforesaid anchoring parts and channels therefor comprise overlapping tongue and groove joints between the bricks of each tier and the bricks of a tier below.

3. A regenerative coke oven battery as claimed in claim 1, and in which the aforesaid anchoring parts and channels therefor comprise overlapping tongue and groove joints between the bricks of each tier and the bricks of a tier below, with thin joints of air setting mortar in the joints between the bricks of adjacent tiers.

4. A regenerative coke oven battery as claimed in claim 1, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat.

5. A regenerative coke oven battery as claimed in claim 1, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat, and a covering layer of a graphitic lubricating agent on said thin covering layer to further facilitate the sliding of the silica on the clay portion of the regenerator walls.

6. A regenerative coke oven battery, comprising: an upper masonry mass of brick constituting a series of alternate horizontal coking chambers and intermediate heating walls arranged side by side in a row, each heating wall comprising vertical combustion flues, and a lower masonry mass of brick constituting a series of crosswise extending regenerators separated by oven supporting regenerator walls below and parallel to the coking chambers and heating walls and resting on a concrete oven supporting mat with horizontal sole flue channels interposed between the bottoms of the regenerators and the top of the concrete mat, said upper and lower masonry mass being composed of silica brick from the oven roof down to the 1000° F. level of the regenerators between the 1200° F. middle height of the regenerators and 750° F. level of the tops of the horizontal sole flue channels and said lower masonry mass being composed of superposed interlocked tiers of clay brick from said lower level down to the top of said concrete mat with overlapping anchoring parts and channels therefor in the bricks of adjacent tiers to restrain the clay bricks from movement under thrust imposed thereon when the silica masonry above expands under heat, said concrete mat having a concrete extension, in the form of a continuous curb alongside the side faces of the battery, extending up to said lower level to terminate at its top at the level of the top of said clay brick, and buckstays anchored at their lower ends at said lower level to the concrete of the mat at the top of said curb and extending upwardly to the top of the battery alongside the ends of said regenerator walls and heating walls at opposite sides of the battery and provided with tie means for drawing them together at the top of the battery, for bracing the silica portion of the oven masonry mass separately and independently of the clay portion of the oven masonry.

7. A regenerative coke oven battery as claimed in claim 6, and in which the aforesaid anchoring parts and channels therefor comprise overlapping tongue and groove joints between the bricks of each tier and the bricks of a tier below.

8. A regenerative coke oven battery as claimed in claim 6, and in which the aforesaid anchoring parts and channels therefor comprise overlapping tongue and groove joints between the bricks of each tier and the bricks of a tier below, with thin joints of air setting mortar in the joints between the bricks of adjacent tiers.

9. A regenerative coke oven battery as claimed in claim 6, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat.

10. A regenerative coke oven battery as claimed in claim 6, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat and a covering layer of a graphitic lubricating agent on said thin covering layer to further facilitate the sliding of the silica on the clay portion of the regenerator walls.

11. A regenerative coke oven battery, comprising: an upper masonry mass of brick constituting a series of alternate horizontal coking chambers and intermediate heating walls arranged side by side in a row, each heating wall comprising vertical combustion flues, and a lower masonry mass of brick constituting a series of crosswise extending regenerators separated by oven supporting regenerator walls below and parallel to the coking chambers and heating walls and resting on a concrete oven supporting mat, with horizontal sole flue channels interposed between the bottoms of the regenerators and the top of the concrete mat, and rich gas riser ducts extending from the mat upwardly through said regenerator walls into communication with the flues in the heating walls, said upper and lower masonry mass being composed of silica brick from the oven roof down to a lower level between the 1200° F. middle height of the regenerators and 750° F. level of the tops of the horizontal sole flue channels and said lower masonry mass being composed of superposed interlocked tiers of clay brick from said lower level down to the top of said concrete mat with overlapping anchoring parts and channels therefor in the bricks of adjacent tiers to restrain the clay bricks from movement under thrust imposed thereon when the silica masonry above expands under heat, said concrete mat having a concrete extension, in the form of a continuous curb alongside the side faces of the battery, extending up to said lower level to terminate at its top at the level of the top of said clay brick, and buckstays anchored at their lower ends at said lower level to the concrete of the mat at the top of said curb and extending upwardly to the top of the battery alongside the ends of said regenerator walls and heating walls at opposite sides of the battery and provided with tie means for drawing them together at the top of the battery, for bracing the silica portion of the oven masonry mass separately and independently of the clay portion of the oven masonry.

12. A regenerative coke oven as claimed in claim 11, and in which the silica is carried down to the 1000° F. level of the regenerators as the aforesaid lower level, and the tops of the clay brick and curbs and the lower anchorage for the buckstays are at said lower level.

13. A regenerative coke oven battery as claimed in claim 11, and in which the aforesaid anchoring parts and channels therefor comprise overlapping tongue and groove joints between the bricks of each tier and the bricks of a tier below.

14. A regenerative coke oven battery as claimed in claim 11, and in which the aforesaid anchoring parts and channels therefor comprise overlapping tongue and groove joints between the bricks of each tier and the bricks of a tier below, with thin joints of air setting mortar in the joints between the bricks of adjacent tiers.

15. A regenerative coke oven battery as claimed in claim 11, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat.

16. A regenerative coke oven battery as claimed in claim 11, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat, and a covering layer of a graphitic lubricating agent on said thin covering layer to further facilitate the sliding of the silica on the clay portion of the regenerator walls.

17. A regenerative coke oven battery, comprising: an upper masonry mass of brick constituting a series of alternate horizontal coking chambers and intermediate heating walls arranged side by side in a row, each heating wall comprising vertical combustion flues, and a lower masonry mass of brick constituting a series of crosswise extending regenerators separated by oven supporting regenerator walls below and parallel to the coking chambers and heating walls and resting on a concrete oven supporting mat, with horizontal sole flue channels interposed between the bottoms of the regenerators and the top of the concrete mat, and rich gas riser ducts extending from the mat upwardly through said regenerator walls into communication with the flues in the heating walls, and recirculating ducts immovably embedded in the concrete of the mat and connecting the rich gas risers of one regenerator wall with those of another wall on opposite sides of intervening regenerators, said upper and lower masonry mass being composed of silica brick from the oven roof down to a lower level between the 1200° F. middle height of the regenerators and 750° F. level of the tops of the horizontal sole flue channels and said lower masonry mass being composed of superposed interlocked tiers of clay brick from said lower level down to the top of said concrete mat with overlapping anchoring parts and channels therefor in the bricks of adjacent tiers to restrain clay bricks from movement under thrust imposed thereon when the silica masonry above expands under heat, said concrete mat having a concrete extension, in the form of a continuous curb alongside the side faces of the battery, extending up to said lower level to terminate at its top at the level of the top of said clay brick, and buckstays anchored at their lower ends at said lower level to the concrete of the mat at the top of said curb and extending upwardly to the top of the battery alongside the ends of said regenerator walls and heating walls at opposite sides of the battery and provided with tie means for drawing them together at the top of the battery, for bracing the silica portion of the oven masonry mass separately and independently of the clay portion of the oven masonry.

18. A regenerative coke oven as claimed in claim 17, and in which the silica is carried down to the 1000° F. level of the regenerators as the aforesaid lower level, and the tops of the clay brick and curbs and the lower anchorage for the buckstays are at said lower level.

19. A regenerative coke oven battery as claimed in claim 17, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat.

20. A regenerative coke oven battery as claimed in claim 17, and in which the aforesaid anchoring parts and channels therefor comprise overlapping tongue and groove joints between the bricks of each tier and the bricks of a tier below, with thin joints of air setting mortar in the joints between the bricks of adjacent tiers, and in which the top tier of clay brick in each regenerator wall comprises a thin covering layer of air setting cement providing a smooth surface for the silica brick above to slide over when it expands under heat, and a covering layer of a graphitic lubricating agent in said thin covering layer to further facilitate the sliding of the silica on the clay portion of the regenerator walls.

No references cited.